United States Patent Office 2,843,361
Patented July 15, 1958

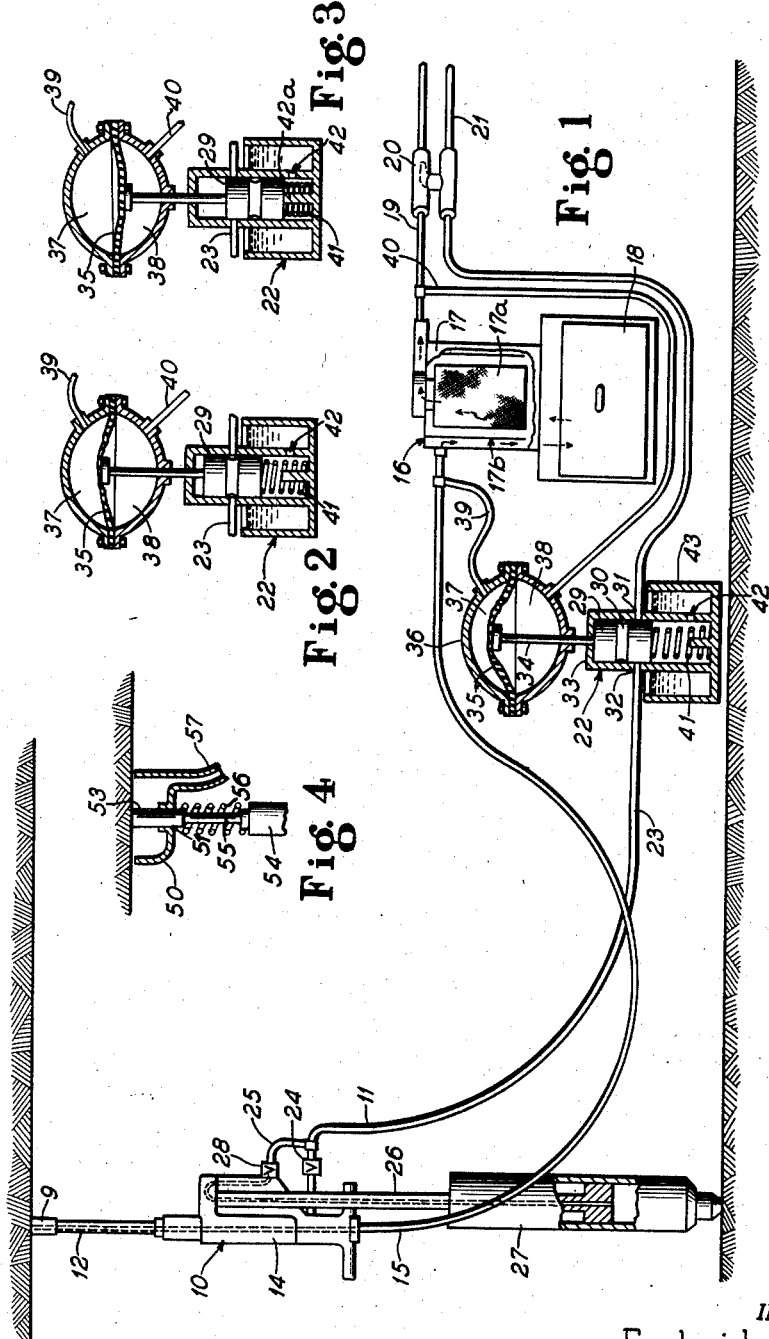

2,843,361
DRILLING SYSTEM

Frederick B. Miller, Chicago, Ill., assignor to Goodman Manufacturing Company, Chicago, Ill., a corporation of Illinois Application November 22, 1954, Serial No. 470,189

3 Claims. (Cl. 255—50)

This invention relates to improvements in fluid pressure operated rock drills having dust evacuating means associated therewith for receiving dust and cuttings from a hole being drilled, and operated from the same source of fluid pressure as the drill.

The principal object of the present invention is to provide an improved fluid pressure system for devices of the character described having means responsive to excessive accumulations in the dust evacuating line and the dust separator of the system for automatically stopping or reducing the flow of operating fluid to the rock drill as a warning to the operator that dust evacuation is being impaired.

A further object of the invention is to provide a system of the character described including means for delaying the response in the reduction of flow of operating fluid to the drill so that such reduction in flow will not become effective due to momentary obstructions in the dust evacuating line of the system.

Other objects and advantages of the invention will appear from time to time as the following description proceeds.

The present application is a continuation in part of my application Serial No. 406,407 filed January 27, 1954, which has been abandoned.

The invention may best be understood by reference to the accompanying drawings in which:

Figure 1 is a diagrammatic view showing a fluid pressure rock drilling system constructed in accordance with my invention with the control valve in one blocked position;

Figure 2 is a diagrammatic view of the control valve of Figure 1, but showing it in open position;

Figure 3 is a diagrammatic view of the control valve showing it in a second blocked position; and Fig. 4 is a fragmentary sectional view showing a modified form of dust receptacle which may be used in conjunction with the system of my invention.

Referring now to details of the embodiment of my invention illustrated in the drawings, Figure 1 shows diagrammatically a rock drill, indicated generally at 10, of a more or less conventional type, adapted for operation by fluid or pneumatic pressure from a pressure line 11. The illustrative form of drill shown is of the hollow shank type such as is shown in the copending application of Holman, Oram and James, bearing Serial Number 232,172, now abandoned, having as one of its characteristic features a hollow bit 9 and hollow drill steel 12, through which the dust and cuttings from the drill hole are carried away by suction through a hollow central passage of the body of pneumatic drill 14 to an eductor line 15 and, from thence, to a dust filter 16. The dust filter may be of any suitable construction such as that disclosed in the copending application of George W. Miller, Serial Number 397,350, filed December 10, 1953, now Patent No. 2,725,115.

In the form of filter shown diagrammatically, the upper casing 17 may consist of a separating chamber while the lower portion 18 includes a removable receptacle for accumulated dust as described in the above application.

A line 19 is connected to the filter casing 17, in communication with the inside of a filter bag 17a in the casing, and leads to an eductor 20 or air-injector device of conventional form, operated by pressure from a fluid pressure line 21. The eductor line 15 directs a mixture of dust and air into the casing 17 in the direction of the arrows in Fig. 1, first passing downward about a vertical sleeve 17b and thence upward to the bag 17a. The lines 15 and 19, together with the filter 16, therefore, form a dust eductor line. The fluid pressure line 21 is connected to a suitable source of pressure (not shown) and leads to one side of an automatic control valve 22. From the other side of the automatic control valve, a fluid pressure line 23 leads to the drill body 14 for actuating the drill in the usual manner. A manual control valve, indicated generally at 24, is provided as usual on the drill body for controlling the operation of the latter. In the form shown diagrammatically in Figure 1, the pressure line 23 has a branch line 25 leading to a conventional stoper leg or post 26 for the pneumatic drill 14, which leg includes a pressure operated jack 27 for engagement with the floor. The branch pressure line 25 to the jack 27 preferably is provided with a check valve 28 therein, to hold the jack in an expanded position when pressure in line 23 is temporarily relieved. Further details of construction of the drill actuating mechanism and the stoper leg need not be shown or described herein, as they form no part of the present invention.

The automatic control valve 22 consists of a valve member 29, herein of the spool type, having an annular groove 30 thereabout adapted for movement into and out of registering relation with opposed inlet and outlet ports 31 and 32 in the casing 33 of said automatic control valve. The valve member 29 is connected by a stem 34 to a flexible diaphragm 35 of an air pressure valve casing 36 having upper and lower chambers 37 and 38 therein, separated by said diaphragm. One of said chambers, as for instance the upper chamber 37, communicates with the input side of the filter casing 17 by a line 39 leading to eductor line 15. The lower pressure chamber 38 communicates with the opposite side of the filter casing by a line 40 leading to the line 19. The arrangement is such that the diaphragm 35 is responsive to slight variations in pressure in the eductor line between the inlet and outlet sides of the filter casing 17.

The stem 34 and the valve member 29 connected to the diaphragm 35 of control valve 22 are normally under a light biasing effect of a spring 41 in the lower end of casing 33 to urge the valve member 29 toward closed position when the suction or pressure in chambers 37 and 38 are nearly the same.

The automatic control valve 22 is preferably of a dash pot type, indicated diagrammatically in Figure 1 by a small orifice 42 formed in the lower end of the valve casing 33 communicating with an oil sump 43 surrounding said casing so that oil will be drawn in and out of said sump when the valve spool 29 is moved down and up respectively. This dash pot arrangement causes a time lag in the valve response, effective during momentary fluctuations in pressure, under certain operating conditions, as will presently be described.

It will thus be seen that the particular valve 22 disclosed here has two closed positions and one open position as shown respectively in Figs. 1 and 3 and in Fig. 2.

The modified form of dust collector means, shown in Figure 4, consists of a bowl type collar 50 having an axial opening 51 therethrough, through which the drill head 53 of a power drill 54 is slidably projected. With this form of device, the drill head 53 of the shank 55 may be solid instead of hollow as shown in connection with the form of drill illustrated in Figure 1. The collar 50 is adapted to be retained in close juxtaposition to the roof by a coil spring 56 surrounding the drill shank 55. The collar 50 is connected to a suction line corresponding to the line 15 of Figure 1 by an outlet 57. It will be understood that, with the form of collector means shown in Figure 4, the power drill 54 will also be connected to a pressure line corresponding to the line 23 shown in Figure 1.

The use and operation will now be described.

There are two kinds of blockage which may cause inefficient dust removal, or render it impossible. The first is blockage somewhere in the drill 14 or in the hose 15, as for example when the material being drilled is too wet or sticky to flow through the passages; the second is blockage in the dust separator or filter 16, as for example when the operator neglects to empty it and it becomes completely filled or the screen 17a becomes plugged.

The present invention warns the operator by shutting off air to the drill either gradually or completely when either of these two kinds of blockage occurs so that he would not attempt to continue to operate it with dust or cuttings backing up in the drill and hose. A commercial eductor of the type shown may create a suction as high as seventeen inches of mercury; that is, an absolute pressure of thirteen inches of mercury, considering standard atmospheric pressure as thirty. This, of course, is under no-flow conditions where the inlet to the eductor is completely blocked. For example, the present case, if the drill passage or the dust eductor line 15 becomes blocked, and there is no leakage in the system, the absolute pressure in the line 19 and in the casing 17 may be reduced to the thirteen inches of mercury mentioned.

Under normal operating conditions, whenever the drill passage, line 15, and separator casing 17 are all clear, the suction exerted by the eductor will be considerably less than the maximum it is capable of drawing. In the typical installation where pressure drop in the drill plus the line 15 is about one inch of mercury and that across the filter 16 is from two to eight inches of mercury depending on how dirty the bag 17a is, the eductor may draw a suction of somewhere in the range between three and twelve inches of mercury under ordinary operating conditions.

The device of this invention controls flow through the pressure line 23 in response to predetermined variations in pressure differentials as measured at two spaced points in the eductor lines 15 and 19. If the suction pressure in line 15 should decrease by reason of blockage in the filter 16 and the suction pressure in the line 19 remain at the same or a higher value, the differential across the diaphragm 35 will cause the valve element 29 to move downward against the spring 41, thereby shutting off the flow of pressure fluid to the drill 10 through the valve 22. Under other conditions, the line 15 may be blocked at a point between the drill bit 9 and the pressure measuring point where the line 39 is connected to the line 15. The suction pressure in this line may accordingly increase very greatly. The suction pressure in the line 19 may be at some lesser value, by reason of the pressure drop at the filter element 16. Under such conditions, a differential pressure of an opposite sense can be created across the diaphragm 35 to move the valve element 29 in the opposite direction from that described before. Theoretically any two points in a line 15 or 19 can be employed for connecting lines 39 and 40 thereto, because as long as there is either flow necessarily creating a differential pressure, or there is some static pressure differential between the two points, the valve 22 can be operated in co-relative directions. As a practical matter however I have chosen to connect the lines 39 and 40 at spaced points in the eductor line on opposite sides of the filter unit 16 because under normal operating conditions there is enough pressure differential to actuate a reasonably small diaphragm 35.

Another reason for selecting the filter unit 16 for bracketing by the pressure differential lines 39 and 40 is that, whenever the dust filter is permitted to fill up through failure to empty it, there will be a definite, substantial change in pressure differential which can be utilized to actuate the control valve 22.

When the system is "at rest," that is not in operation, the valve spool 29 will be urged to the blocked position shown in Fig. 1. To begin operation, as for instance at the beginning of a shift, a valve (not shown) in line 21 will be opened permitting pressure to flow all the way up to the spool 29. Some of the air will be bypassed through the eductor 20 creating a suction or partial vacuum in line 19. As mentioned above, there will be some normal pressure drop across the filter bag 17a, even when new and clean. This causes a pressure differential between the ends of lines 39 and 40 by reason of the fact that the passage in the drill communicates directly with the atmosphere. Thus, the pressure in chamber 37 exceeds the pressure in chamber 38 by an amount corresponding to the pressure differential across the dust removing unit 16. This causes the spool 29 to be moved downward by the diaphragm 35 to its normal operating position (Fig. 2), the spring 41 being sized to permit the valve to be maintained open at pressure differentials across the filter unit which are encountered in normal, free-flowing operation.

If blockage should occur anywhere in the bit 9, drill steel 12, drill 14 or hose 15 up to the point of connection with the line 39, the eductor 20 will draw maximum suction in line 19 bringing the absolute pressure down to, say, thirteen inches of mercury. This change in pressures would be transmitted through line 40 into chamber 38 and would be transmitted through the filter unit 16 and line 39 to the chamber 37. Thus, with the pressure more equal on both sides of the diaphragm, the spring 41 would urge the spool 29 to the closed position shown in Fig. 1 thereby making it impossible for the operator to use the drill normally and warning him to stop and correct the blockage.

If, on the other hand, blockage occurs in the bag 17a or anywhere else in the filter unit 16, again maximum suction would be produced in line 19 and the chamber 38 would be reduced to an absolute pressure of, say, thirteen inches of mercury. Atmospheric pressure would be communicated through lines 15 and 39 into the chamber 37. That is, the chamber 37 would have an absolute pressure of thirty inches of mercury while the chamber 38 would have a pressure of only thirteen inches of mercury. The higher pressure would drive the diaphragm 35 downward, the spool being stopped by engagement with a stop 42a. This is the second closed position, illustrated in Fig. 3. Again, air to the drill would be shut off forcing the operator to correct the blockage before he could continue drilling.

By proper selection of the strength of spring 41 and by suitable selection of the width and position of the groove 30 in the spool, the device of the present invention may readily be made to deactivate the drill at the time blockage begins, rather than after it has already completely blocked off the dust removing lines. As a result, the operator would be automatically warned that there is an obstruction in the drill, line 15, or filter early enough so that it would be unblocked easily with a minimum of down time. This warning may be noted either by a reduction in operating pressure, due to partial closing of valve 22, or by complete shutting off of the valve 22, as the case may be.

Under some conditions, the flow of air through the drill or dust eductor line 15 may become momentarily obstructed, as for instance when the tip of the drill is temporarily blocked by engagement with solid rock. In such case, the dash pot associated with the automatic control valve 22 will operate to delay shutting off of operating pressure through the latter valve a sufficient length of time to permit the drill to clear itself and continue operation.

Although I have shown and described certain embodiments of my invention, it will be understood that I do not wish to be limited to the exact construction shown and described but that various changes and modifications may be made without departing from the spirit and scope of the invention as defined in the appended claims.

I claim:

1. In a drilling system employing a drill actuated by pressure fluid from a pressure source, a pressure line connecting the drill to the pressure source, means located adjacent the point of drilling for receiving dust and cuttings resulting from the operation of the drill, an eductor line connecting said means with a source of suction, means for removing cuttings and dust transported through the eductor line, a valve in the pressure line effective to regulate the flow of pressure fluid to the drill, and means for controlling the operation of the valve, said controlling means comprising means connected to the eductor line at spaced points thereon and movable in response to differences in the pressure in the eductor line between said points and means interconnecting the last named means and the valve to operate the valve in response to variations of said pressure differences.

2. The structure claimed in claim 1, said spaced points being located on one each side of the dust and cuttings removing means.

3. The structure claimed in claim 1, said valve comprising a movable valve element, and dashpot means acting on said element for retarding the movement of the valve element to prevent operation of the valve upon only momentary variations of said pressure differences.

References Cited in the file of this patent

UNITED STATES PATENTS 2,644,482    McCallum _____ July 7, 1953

FOREIGN PATENTS 409,657    Italy _____ Feb. 27, 1945
410,577    Italy _____ Apr. 17, 1945

UNITED STATES PATENT OFFICE
CERTIFICATE OF CORRECTION

Patent No. 2,843,361                      July 15, 1958

Frederick B. Miller

It is hereby certified that error appears in the printed specification of the above numbered patent requiring correction and that the said Letters Patent should read as corrected below.

Column 6, line 8, for "on one" read --one on--.

Signed and sealed this 7th day of October 1958.

(SEAL)
Attest:

KARL H. AXLINE

Attesting Officer

ROBERT C. WATSON
Commissioner of Patents